United States Patent
Hartmann

(10) Patent No.: US 10,824,883 B2
(45) Date of Patent: Nov. 3, 2020

(54) METHOD AND APPARATUS FOR DETERMINING A ROAD CONDITION

(71) Applicant: Continental Teves AG & Co. oHG, Frankfurt (DE)

(72) Inventor: Bernd Hartmann, Bad Homburg (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 185 days.

(21) Appl. No.: 15/948,103

(22) Filed: Apr. 9, 2018

(65) Prior Publication Data

US 2018/0293448 A1    Oct. 11, 2018

(30) Foreign Application Priority Data

Apr. 11, 2017   (DE) .................. 10 2017 206 244

(51) Int. Cl.
| | |
|---|---|
| G06K 9/00 | (2006.01) |
| B60W 40/06 | (2012.01) |
| B60T 8/172 | (2006.01) |
| G06T 7/514 | (2017.01) |
| B60W 30/02 | (2012.01) |

(Continued)

(52) U.S. Cl.
CPC .......... G06K 9/00805 (2013.01); B60T 8/172 (2013.01); B60W 30/02 (2013.01); B60W 40/06 (2013.01); G06K 9/00791 (2013.01); G06T 7/514 (2017.01); *B60T 2210/13* (2013.01); *B60W 50/14* (2013.01); *B60W 2420/42* (2013.01); *B60W 2552/00* (2020.02); *G05D 1/0088* (2013.01); *G06T 2207/30252* (2013.01)

(58) Field of Classification Search
CPC .......... G06K 9/00805; G06K 9/00791; B60W 40/06; B60W 30/02; B60W 50/14; B60W 2420/42; B60W 2550/14; B60T 8/172; B60T 2210/13; G06T 7/514; G06T 2207/30252; G05D 1/0088
See application file for complete search history.

(56) References Cited

U.S. PATENT DOCUMENTS

| | | | |
|---|---|---|---|
| 10,078,892 B1 * | 9/2018 | Wang ................. | B60C 11/246 |
| 2004/0204812 A1 * | 10/2004 | Tran .................. | G01N 21/84 |
| | | | 701/80 |

(Continued)

FOREIGN PATENT DOCUMENTS

| | | |
|---|---|---|
| DE | 102010063017 | 6/2012 |
| DE | 102012221518 | 5/2014 |

(Continued)

OTHER PUBLICATIONS

German Examiner Steffen Merunka, German Search Report for German Patent Application No. 10 2017 206 244.4, dated Jan. 31, 2018, 7 pages, Muenchen, Germany, with partial English translation, 5 pages.

*Primary Examiner* — Thomas Ingram
(74) *Attorney, Agent, or Firm* — W. F. Fasse

(57) ABSTRACT

A road condition is classified based on spray water occurring at a wheel of the vehicle. To this end, the space around a wheel of the vehicle is imaged by a camera and the image captured by the camera is analyzed to detect spray water therein. A distinction can be made between a dry road, a wet road or a road having a risk of aquaplaning on the basis of the detected spray water, e.g. based on the angle, direction or projection range of the spray water.

12 Claims, 2 Drawing Sheets

(51) Int. Cl.
*B60W 50/14* (2020.01)
*G05D 1/00* (2006.01)

(56) References Cited

U.S. PATENT DOCUMENTS

| | | | |
|---|---|---|---|
| 2010/0002244 A1* | 1/2010 | Iino | G01M 17/027 |
| | | | 356/601 |
| 2013/0211720 A1 | 8/2013 | Niemz | |
| 2013/0332028 A1* | 12/2013 | Heger | B60Q 1/085 |
| | | | 701/36 |
| 2014/0232852 A1* | 8/2014 | Nobis | G01B 11/22 |
| | | | 348/128 |
| 2015/0153266 A1 | 6/2015 | Mack | |
| 2016/0379065 A1* | 12/2016 | Hartmann | G06K 9/00798 |
| | | | 348/148 |
| 2017/0161572 A1* | 6/2017 | Zhao | G06K 9/3233 |
| 2018/0370432 A1* | 12/2018 | Imaizumi | B60R 1/00 |

FOREIGN PATENT DOCUMENTS

| | | |
|---|---|---|
| DE | 102013113431 | 6/2015 |
| DE | 102016009928 | 2/2017 |
| JP | 2007-322231 A | 12/2007 |

\* cited by examiner

METHOD AND APPARATUS FOR DETERMINING A ROAD CONDITION

FIELD OF THE INVENTION

The present invention relates to a method and an apparatus for determining a road condition. In particular, the present invention relates to the identification of a road having a risk of aquaplaning. The present invention additionally relates to a motor vehicle having an apparatus for determining a road condition.

BACKGROUND INFORMATION

Aquaplaning is the name given to the phenomenon of a tire floating on a film of water of a wet road. A wedge of water pushes itself under the tire contact area, therefore resulting in a loss of adhesion. At the moment of aquaplaning no steering or braking forces can be transferred to the road. The occurrence of aquaplaning represents a significant risk to the operation of a motor vehicle. This results in a particular danger due to the fact that, in many cases, aquaplaning occurs without any significant advance warning that can be identified by the driver and, consequently, the driver is surprised by this risk. In the process, the tire loses contact completely with the road during aquaplaning, and the vehicle virtually floats on the water. In this condition, the vehicle cannot be either steered or braked. Since aquaplaning only occurs as a function of a displaced quantity of water per unit of time above a critical vehicle speed, accidents are often particularly serious due to the high vehicle speed.

It is therefore desirable to identify the risk of aquaplaning as early as possible so that the way in which a driver is driving a motor vehicle or an assistance system which is present in the vehicle can be adjusted accordingly. There therefore exists a need to determine the road condition. In particular, it is necessary to determine a road condition which includes the risk of aquaplaning.

SUMMARY OF THE INVENTION

It is an object of at least one embodiment of the invention to provide improvements and to overcome one or more of the disadvantages of the prior art. The present invention particularly provides a method for determining a road condition, an apparatus for determining a road condition, as well as a motor vehicle, respectively having features as set forth herein.

A method for determining a road condition includes the step of providing image data. In the process, the image capturing device captures at least a part of a space around a wheel of a vehicle. Furthermore, the method includes the step of detecting spray water in the provided image data. The method additionally includes a step for classifying a road condition using the detected spray water in the provided image data. The classifying of the road condition includes making at least one distinction between a dry road, a wet road and a road having a risk of aquaplaning.

An apparatus for determining a road condition includes an image capturing device and an evaluation device. The image capturing device is designed to capture image data of at least a part of a space around a wheel and to provide the captured image data. The evaluation device is designed to detect spray water in the provided image data and to classify a road condition using the spray water detected in the image data. In this case, the classifying of the road condition by the evaluation device includes making at least one distinction between a dry road, a wet road and a road having a risk of aquaplaning.

A motor vehicle especially has an apparatus according to the invention for determining a road condition.

A realization which forms the basis of at least one embodiment of the present invention is that aquaplaning, as a general rule, comes as a surprise to the driver of a vehicle and also to assistance systems of a vehicle driving in a wholly or partially automated manner. When aquaplaning occurs, a wedge of water pushes itself under the tire contact area, therefore resulting in a loss of adhesion. As long as no aquaplaning occurs, the water can be accommodated by the tire via channels in the tire tread on a wet road having a low depth of water. Due to its surface tension, the water adheres to the tire and is subsequently projected by the centrifugal forces into the wheel arch. In the event of aquaplaning looming and occurring, the tire has to displace more and more water. During this, the quantity of water projected by the tire into the wheel arch is initially increased. In addition, water is also increasingly displaced to the side and forwards by the increased back pressure.

An idea which therefore forms the basis of at least one embodiment of the present invention is to take account of this realization and to identify looming aquaplaning by evaluating the spray water at one wheel of the vehicle at least and the surrounding space. Here, a distinction can at least be made between three different conditions. In the case of a dry road, no spray water is, as a general rule, present so that a dry road can be deduced from the absence of spray water. If, on the other hand, spray water occurs, this is an indication that a road is at least wet, that is to say a road has water located thereon. As long as the tire of the vehicle remains in direct contact with the road, the spray water will at least to the greatest possible extent be spray water which, due to the radial movement of the wheel, is projected into the wheel arch. As the probability of aquaplaning increases, spray water will, in addition, increasingly occur to the side or, possibly, even forwards. Consequently, a risk of aquaplaning or the presence of aquaplaning can be deduced from the analysis of the spray water at a wheel of a vehicle.

Since a direct relationship can be derived between the appearance of the spray water and the risk of aquaplaning, a possible risk of aquaplaning can be directly deduced from the detected spray water. A special, possibly elaborate or error-prone calibration of sensors is not required in this case. Therefore, a very reliable detection of a possible risk of aquaplaning can be achieved by detecting the spray water, in particular by optically capturing the spray water at one wheel at least and the surrounding space. In particular, it is also unnecessary, following a tire change or following a change to one or more parameters of the vehicle tire, to adjust the system in order to detect the risk of aquaplaning.

A driver of a vehicle can be made aware of possible hazardous situations early on by such a reliable detection of a risk of aquaplaning. In addition, it is also possible to include the information regarding the risk of aquaplaning in driver assistance systems, as well as systems for wholly or partially automated driving as well, so that the quality of driving of the vehicle can be adjusted to the relevant weather conditions. This can result in a significant increase in safety.

According to one embodiment, the classifying of the road condition additionally includes detecting a risk of microaquaplaning. Here, a condition in which the vehicle, in particular at least one wheel of the vehicle, is located immediately prior to aquaplaning is referred to as microaquaplaning. In this microaquaplaning condition, the contact zone, in which the tire of the vehicle and the road are in direct contact, tends virtually towards zero or is at least reduced to a minimum. In this case, it is true that the vehicle can still be braked and/or maneuvered to a limited extent in this condition, however aquaplaning is immediately imminent. This makes itself felt, by way of example, during braking from higher speeds in such a manner that the braking distance is significantly extended. This condition therefore acquires a particular importance since, in this condition, it is still possible to intervene in the road behavior of the vehicle.

According to one embodiment, the detecting of spray water includes determining an exit position of the spray water in the image data, an exit angle of the spray water in the image data, determining a quantity of the spray water in the image data, determining a number of drops in the image data and/or determining a projection range and/or a projection direction of the spray water. Further parameters for evaluating the spray water in the image data are, in addition, likewise possible. By determining and evaluating such characteristic properties of the spray water, the probability of aquaplaning occurring and, therefore, of the criticality of the driving situation can be easily determined.

According to one embodiment, the detecting of spray water includes determining a proportion of image data with spray water. To this end, the number of pixels in the image data, which represent spray water, can, by way of example, be determined. Likewise, it is, by way of example, possible to determine an area ratio, a pixel ratio or other ratio between image data with spray water and image data without spray water.

According to one embodiment, the detecting of spray water includes detecting a change in the proportion of spray water in the image data. Thus, a temporal increase or decrease in pixels which are connected to spray water, or of water drops in the image data can, by way of example, be determined.

According to one embodiment, the method includes a step involving transferring the classified road condition to a display device and/or a control device of the vehicle. In this way, the classified road condition can be displayed to a driver of the vehicle, so that the latter can subsequently adjust his road behavior. Likewise, it is possible for a control device to receive and evaluate the classification of the road condition and, subsequently, for a driver assistance system or a system of the wholly or partially automated driving to adjust the control processes in accordance with the classified road condition. The classification of the road condition can additionally be transferred by means of a transfer device to further vehicles or a central data processing device.

According to one embodiment of the apparatus for determining the road condition, the apparatus includes a lighting device. The lighting device is designed to illuminate the region captured by the image capturing device at least partially. Here, the illumination can be provided by means of visible or invisible light. In particular, an illumination with infrared light or light of a predetermined wavelength or of a predetermined wavelength spectrum is, by way of example, possible. In this way, it is possible to also reliably detect spray water at the wheel of the vehicle, even when it is dark or in unfavorable lighting conditions.

According to one embodiment, the apparatus for determining the road condition includes a signaling device. The signaling device is designed to output signaling if a predetermined road condition has been classified. This signaling can, by way of example, be an optical, acoustic or haptic signal which is output to the driver of the vehicle.

In addition, the signaling can also include an electronic signal which, by way of example, is transferred to a further unit of the vehicle. In this way, the control of the vehicle can be automatically adjusted to the classified road condition. The signaling can additionally include a transferring of the classified road condition to an external device, by way of example a further vehicle or a central data processing device.

According to one embodiment of a motor vehicle having an apparatus for determining the road condition, the motor vehicle includes a control apparatus which is designed to adjust at least one function of the motor vehicle using the classified road condition. In this way, the road behavior of the vehicle can be adjusted as a function of the classified road condition. This increases the safety of driving.

The above configurations and further developments can be combined freely with each other, inasmuch as this is reasonable. Further configurations, further developments and implementations of the invention also include combinations of features of the invention described above or below with regard to the embodiment examples, but which are not explicitly indicated. In particular, the person skilled in the art will, in this case, also add individual aspects as improvements or additions to the respective basic forms of the invention.

BRIEF DESCRIPTION OF THE DRAWINGS

The present invention will be explained in greater detail below on the basis of the embodiment examples indicated in the schematic figures of the drawings, wherein.

DETAILED DESCRIPTION OF EXAMPLE EMBODIMENTS OF THE INVENTION

Figure 1:
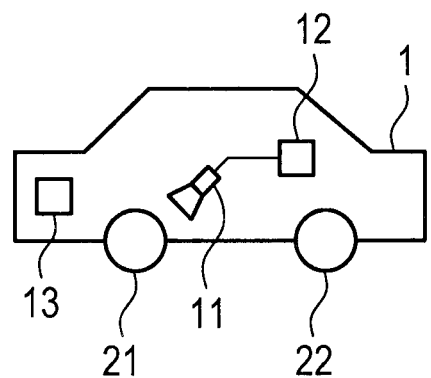
FIG. 1: shows a schematic representation of a motor vehicle having an apparatus for determining a road condition according to one embodiment.

FIG. 1 shows a schematic representation of a vehicle 1 having an apparatus for determining a road condition. The apparatus for determining the road condition includes at least one image capturing device 11 as well as an evaluation device 12. The image capturing device 11 can be, by way of example, a camera or a camera system having multiple cameras. The cameras of the image capturing device 11 can in principle be any suitable camera such as, for example, a camera for recording monochromatic image data or a camera for capturing colored image data. In particular, the image capturing device 11 can also be a camera, which is already present in the vehicle 1, forming part of a driver assistance system or of any other system of the vehicle 1. The image capturing device 11 is, in this case, directed at a wheel 21 of the vehicle 1, a side of the vehicle 1 or at least a region surrounding the wheel 21. In other words, at least one wheel 21 or the wheel arch, which surrounds this one wheel 21, or a side of the vehicle 1 is located in the field of view (FOV) of the image capturing device 11.

In this case, in order to determine the road condition, it is in principle sufficient to capture at least one wheel 21 of the vehicle 1 by means of an image capturing device. In addition, it is, however, also possible to optically capture multiple wheels 21 of the vehicle 1 by means of one or more image capturing device(s) 11. By way of example, one rear wheel 21 or both rear wheels 21 of a vehicle 1 can be captured by means of image capturing devices 11. In addition, it is also possible to additionally or alternatively optically capture one or both front wheels 22 of the vehicle 1, likewise by means of one or more image capturing devices 11. However, one or both front wheel(s) is/are preferably used since the effect of the spray water occurring is greater than it is at the rear wheels.

The image capturing device 11 can, in this case, capture image data of a wheel 21 of the vehicle 1 in the visible light spectrum. In this case, colored or monochromatic image data can be detected. Additionally or alternatively, it is also possible to capture image data in the invisible infrared and/or ultraviolet wavelength range.

The image capturing device 11 can, in this case, optically capture at least one wheel 21 of the vehicle 1 completely. In addition, a further region can also be optically captured in the surroundings around the wheel 21 of the vehicle 1. It is, however, also possible to only optically capture a partial region of the wheel 21 and a suitable surrounding region around said partial region by means of the image capturing device 11. The image region to be captured by the image capturing device 11 should, in this case, in addition to at least a part of the wheel 21 or a part of the wheel arch of the vehicle 1, also include a surrounding region in which, in the event of wet road conditions, spray water is to be expected, which is displaced by the wheel 21 during a movement of the vehicle 1.

The image capturing device 11 can, by way of example, periodically capture the field of view (FOV) with a predefined image refresh rate and provide image data accordingly. However, it is in principle also possible to adjust the image refresh rate for capturing the image data as a function of further parameters, by way of example the vehicle speed or similar.

In order to make possible optical capturing by means of the image capturing device 11, even in unfavorable lighting conditions and in the dark, the field of view of the image capturing device 11 or, possibly, even just a partial region thereof can be illuminated by means of a suitable lighting device 13. The light emitted by the lighting device 13 can, in particular, be adjusted to the wavelength region captured by the image capturing device 11. Thus, infrared light in the relevant wavelength region can also be emitted by the lighting device 13, by way of example, during the capturing of infrared light by the image capturing device 11. By using invisible light such as, for example, infrared light, an adverse effect on further persons, in particular on operators of other vehicles, or other persons in the surroundings of the vehicle 1 can be avoided.

The image data captured by the image capturing device 11 are subsequently provided to the evaluation device 12. The evaluation device 12 hereby processes the image data provided by the image capturing device 11 and hereby detects, in particular, elements in the provided image data, which are to be assigned to spray water. The spray water to be detected in the image data is, in this case, water which is displaced by the wheel 21 monitored by the image capturing device 11, and/or water which initially adheres to the respective wheel 21 and which is then projected away from the wheel 21 due to the radial movement of the wheel 21. The evaluation device 12 can hereby determine one or more characteristic properties of the detected spray water in the image data.

Based on characteristic properties of the spray water in the image data, the road condition is subsequently classified by the evaluation device 12. This classification of the road condition includes, in this case, at least three classes of road conditions: a dry road, a wet road and a road having a risk of aquaplaning.

If no or at least virtually no spray water is detected in the image data captured by the image capturing device 11, the road is classified as a dry road. If, on the other hand, spray water is detected in the image data captured by the image capturing device 11, this means that a road is at least wet—a risk of aquaplaning can, in addition, possibly exist. Therefore, if spray water occurs, an additional analysis is carried out in order to detect a possible risk of aquaplaning from one or more characteristic properties of the spray water or, possibly, to estimate the probability of a risk of aquaplaning.

In the case of a wet road a part of the water will initially adhere to the wheel 21. This water is partially projected away due to the radial movement as the vehicle continues its course. This spray water, which already occurs on a wet road which does not have a risk of aquaplaning, is spray water which is projected away from the wheel 21 into the wheel arch of the vehicle 1. In the event of such spray water occurring, the road can therefore at least be classified as wet.

In the case of a wet road, the water located on the road can, in this case, initially flow off thanks to the grooves in the profile of a tire of the wheel 2. As long as the water can continue to flow off sufficiently, the projecting parts of the profile in such a tire can still come into contact with the road, so that an adhesive and braking action continues to exists. As the quantity of water increases and/or the speed of the vehicle 1 increases, water is thereby also increasingly displaced to the side and, possibly, also forwards. The risk of aquaplaning also increasingly rises in the process. Therefore, a rise in the spray water, in particular the detection of laterally and/or forwardly directed spray water can also be judged to be an indication of an increasing risk of aquaplaning. If the detected spray water exceeds a predefined threshold, the road condition is therefore classified as "risk of aquaplaning". In this case, both the total quantity of the spray water, the quantity of spray water detaching itself from the wheel, which is projected into the wheel arch, and/or the spray water which is directed laterally or forwards can be evaluated as a criterion for detecting a risk of aquaplaning.

In order to consider the quantity of spray water, multiple different parameters are, in this case, possible. Thus, all of the pixels in a frame of the image data provided by the image capturing device 11 can, by way of example, be evaluated and, in this case, a distinction can be made between pixels which are to be assigned to spray water and pixels which are not to be assigned to spray water. Accordingly, in the event of a first number of pixels which are to be assigned to spray water being exceeded, a road can at least be classified as wet and, in the event of a further threshold being exceeded, the road can be classified as a road having a risk of aquaplaning. In addition, it is also possible to add up all of the area proportions in a frame, which are to be assigned to spray water. In this case as well, in the event of a first threshold being exceeded, the road can be classified as wet and, in the event of a second threshold being exceeded, the road can be classified as a road having a risk of aquaplaning. Furthermore, it is also possible to evaluate the change in the proportions of the spray water in the captured image data and, in the event of a rapid rise in the spray water proportion, to deduce a wet road or respectively a road having a risk of aquaplaning. In this case, the thresholds for distinguishing between a dry road, a wet road and a road having a risk of aquaplaning can, possibly, also be adjusted based on further parameters such as, by way of example, the vehicle speed or windscreen wiper activity of the vehicle 1 or the external temperature.

Furthermore, it is also possible to determine an angle of the spray water in the image data detected by the image capturing device 11 and to distinguish the classification of the road condition based on one or, possibly, multiple angles of the spray water in the image data. It is additionally possible to classify the road condition based on a projection range of the spray water and/or a projection direction of the spray water. Further parameters such as drop or jet form of the exiting water are, in addition, just as possible for distinguishing the road conditions.

The classification of the road condition can, in addition to the three previously described road conditions, also possibly distinguish between one or more further road conditions. Thus, a further road condition which is referred to as "microaquaplaning" is, by way of example, possible. This road condition, which is referred to as microaquaplaning, involves a road condition in which it is true that an adhesive effect—albeit possibly only a small adhesive effect—of the wheel 21 to the road does still exist, however full aquaplaning is immediately imminent.

Figure 2:
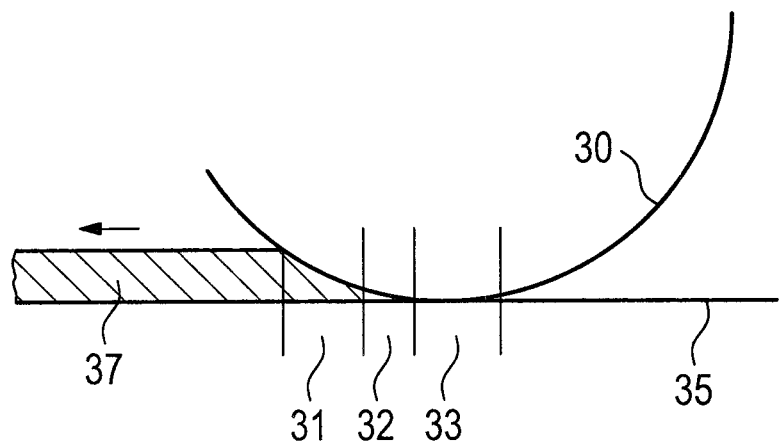
FIG. 2: shows a schematic representation of a three-zone model for a vehicle tire in the wet.

FIG. 2 shows a schematic representation of a three-zone model in order to describe the contact between a tire 30 and a road 35. The water 37 located on the road is, in this case, shown in a hatched manner. In this case, the contact surface of the tire 30 with the road 35 can be subdivided into three regions 31-33. If the vehicle and, consequently, also the tire 30 is moving in the direction of travel identified by the direction of the arrow, an approach zone 31 is initially formed at the tire, in which approach zone water is located in approximately the shape of a wedge between the tire 30 and the road 35. Adjoining this approach zone 31 is a transition zone 32. In the region of the contact zone 33 which adjoins the transition zone 32 the tire 30 is in direct contact with the road 35, as a result of which a corresponding adhesive effect can be attained. As the water level increases and/or the driving speed increases, the contact zone 33 and, therefore, the contact surface between the tire 30 and the road 35 decreases. If this expansion of the contact zone 33 tends towards zero, the risk of aquaplaning is immediately imminent. This condition is therefore referred to as microaquaplaning. If a contact zone 33 no longer exists, that means water is located in the entire region between the tire 30 and the road 35, aquaplaning occurs and a vehicle can no longer be controlled or braked in a controlled manner during this condition.

Figure 3:
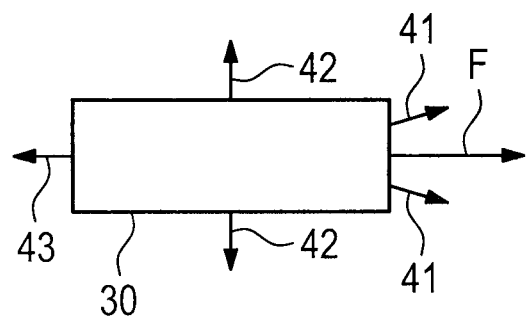
FIG. 3: shows a schematic representation of the course of the spray water as it forms the basis of the determination of a road condition according to one embodiment.

FIG. 3 shows a schematic representation of the individual spray water directions of a tire 30 with direction of travel F. Whereas, obviously, no spray water occurs with a dry road, in the case of a wet road, as already described above, because of the adhesion of water to the surface of the tire 30, spray water initially forms which, due to the radial movement of the tire 30, is projected away from the tire 30. This spray water is projected backwards up into the wheel arch of the vehicle and exits laterally at the rear part of the wheel arch in drop or jet form. This proportion of the spray water is identified in FIG. 3 with the reference numeral 43. As the water level increases and/or the driving speed increases, spray water is also increasingly displaced to the side in the direction 42. In addition, a kind of bow wave can also be configured in the direction of travel F in front of the tire 30, which bow wave also, possibly, produces spray water forwards in the directions 41. In both cases, this spray water is caused by an increased water pressure in the event of a risk of aquaplaning. The main exit location of the water is, in each case, at the bottom in the region of the contact between the tire and road, that is to say at the so-called contact patch of the tire. This is associated with water projected into the wheel arches by the centrifugal force, which water exits laterally from the wheel arches, and with a significant amount of spray developing in the entire region in the vicinity of the wheel.

Accordingly, a wet road which is merely wet can be deduced in the event of spray water occurring only in the direction 43, whereas in the event of an increased amount of spray water occurring in the directions 42 and 41, the probability of microaquaplaning or respectively aquaplaning increases. The road condition and, in particular, the probability of imminent aquaplaning can therefore be deduced from the quantity and/or the direction of the spray water.

The classification of the road condition, in particular an indication of a wet road as well as the detection of a risk of aquaplaning, can subsequently be output to a driver of the vehicle. By way of example, an optical and/or acoustic and/or haptic signal can be output to the driver of the vehicle as the risk of aquaplaning increases. The driver of the vehicle can subsequently adjust the quality of driving accordingly, by way of example lower the speed and thus prevent uncontrolled road behavior due to aquaplaning.

In addition, it is also possible to provide the classification of the road condition, in particular the detection of a wet road as well as the detection of a risk of aquaplaning or respectively, possibly, of microaquaplaning or the probability of aquaplaning to a further control system of the vehicle 1. By way of example, a driver assistance system can automatically intervene in the road behavior of the vehicle based on the classification of the road condition, in order to prevent uncontrolled road behavior due to aquaplaning or, possibly, to also take over control of the vehicle if aquaplaning occurs, in order to avoid hazardous steering and/or braking maneuvers during aquaplaning. A wholly or partially automated driving system can additionally adjust the road behavior in accordance with the classification of the road condition.

It is additionally possible to transfer a detected road condition, in particular the detection of a risk of aquaplaning or respectively the probability of aquaplaning, by means of a communication device, by way of example a radio interface or similar, to further vehicles or a central computing system. In this way, further road users can also make use of the classification of the road condition.

Figure 4:
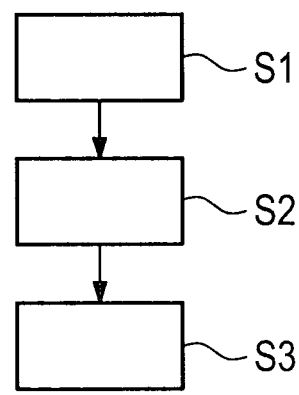
FIG. 4: shows a schematic representation of a flowchart as it forms the basis of a method for determining a road condition according to one embodiment.

FIG. 4 shows a schematic representation of a method for determining a road condition according to one embodiment. In a first step S1, image data are initially captured and provided by an image capturing device 11. The image capturing device 11 is hereby, as already described above, directed towards at least one wheel 21 of the vehicle, a region which surrounds the wheel 21 and/or at least one side of the vehicle 1. In step S2, spray water is detected in the captured image data. Using the detected spray water in the provided image data, the road condition is classified in step S3. The classification includes, in this case, making at least one distinction between three road conditions: dry road, wet road, and aquaplaning road. In addition, one or more further road conditions are also possible. In particular, the classification can, by way of example, also include a further road condition of looming aquaplaning which is referred to here as microaquaplaning.

To summarize, the present invention relates to a classification of a road condition based on the spray water occurring at one wheel of the vehicle. To this end, the space around a wheel of the vehicle is captured or imaged by means of a camera and the image captured by the camera is analyzed in order to detect spray water therein. A distinction can be made between a dry road, a wet road or a road having a risk of aquaplaning on the basis of the detected spray water, by way of example the angle, direction or projection range of the spray water.

What is claimed is:

1. A method of determining a road condition, comprising the steps:
    a) by an image capturing device, providing image data that includes images of at least a part of a space around a wheel of a vehicle driving on a road;
    b) in the image data, detecting spray water that sprays from the wheel, including determining at least one parameter of the spray water selected from an exit position of the spray water, an exit angle of the spray water, a projection range of the spray water, and a projection direction of the spray water; and
    c) in response to and dependent on the spray water detected in the image data and the determined at least one parameter of the spray water, classifying a road condition of the road among three classes identified as a dry road, a wet road without risk of aquaplaning, and a wet road with risk of aquaplaning.

2. The method according to claim 1, wherein the classifying of the road condition additionally includes detecting a risk of microaquaplaning when the road condition has been classified as the wet road with risk of aquaplaning.

3. The method according to claim 1, wherein the at least one parameter of the spray water additionally includes at least one of a quantity of the spray water, a number of drops of the spray water, and/or a distinction between a drop form or a jet form of the spray water.

4. The method according to claim 1, wherein the detecting of the spray water in the image data additionally includes establishing a proportion of the image data having the spray water.

5. The method according to claim 4, wherein the detecting of the spray water in the image data additionally includes detecting a change in the proportion of the image data having the spray water.

6. The method according to claim 1, further comprising transferring the classified road condition to a display device and/or a control device of the vehicle.

7. An apparatus for determining a road condition, comprising:
    an image capturing device configured to capture and provide image data that includes images of at least a part of a space around a wheel of a vehicle driving on a road; and
    an evaluation device configured to detect, in the image data, spray water that sprays from the wheel, to determine at least one parameter of the spray water selected from an exit position of the spray water, an exit angle of the spray water, a projection range of the spray water, and a projection direction of the spray water, and to classify a road condition of the road in response to and dependent on the spray water detected in the image data and the determined at least one parameter of the spray water,
    wherein the road condition is classified among three classes identified as a dry road, a wet road without risk of aquaplaning, and a wet road with risk of aquaplaning.

8. The apparatus according to claim 7, further comprising a lighting device configured to at least partially illuminate the detected spray water in the space around the wheel of the vehicle driving on the road.

9. The apparatus according to claim 7, further comprising a signaling device configured to output a signal when the road condition has been classified as belonging to a predetermined one of the three classes.

10. The apparatus according to claim 7, further comprising a transfer device configured to transfer the classified road condition to a further device.

11. A motor vehicle comprising a vehicle body and an apparatus for determining a road condition mounted on the vehicle body,
    wherein the apparatus comprises:
        an image capturing device configured to capture and provide image data that includes images of at least a part of a space around a wheel of the motor vehicle driving on a road; and
        an evaluation device configured to detect, in the image data, spray water that sprays from the wheel, to determine at least one parameter of the spray water selected from an exit position of the spray water, an exit angle of the spray water, a projection range of the spray water, and a projection direction of the spray water, and to classify a road condition of the road in response to and dependent on the spray water detected in the image data and the determined at least one parameter of the spray water,
        wherein the road condition is classified among three classes identified as a dry road, a wet road without risk of aquaplaning, and a wet road with risk of aquaplaning.

12. The motor vehicle according to claim 11, further comprising a control apparatus configured to adjust at least one function of the motor vehicle in response to and dependent on the classified road condition.

* * * * *